(12) United States Patent
Kott et al.

(10) Patent No.: US 9,284,658 B2
(45) Date of Patent: Mar. 15, 2016

(54) PROCESS FOR SELECTIVE ISOLATION OF CFRP PARTS BY ELECTRODEPOSITION COATINGS

(71) Applicant: Airbus Operations GmbH, Hamburg (DE)

(72) Inventors: Rouven Kott, Bremen (DE); Armin Fangmeier, Rahden (DE); Simone Schroeder, Bremen (DE); Thomas Lemckau, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 59 days.

(21) Appl. No.: 13/948,418

(22) Filed: Jul. 23, 2013

(65) Prior Publication Data

US 2014/0151231 A1 Jun. 5, 2014

Related U.S. Application Data

(60) Provisional application No. 61/674,898, filed on Jul. 24, 2012.

(30) Foreign Application Priority Data

Jul. 24, 2012 (EP) .................................... 12177698

(51) Int. Cl.
| | | |
|---|---|---|
| *C25D 13/00* | (2006.01) | |
| *B29C 73/00* | (2006.01) | |
| *C25D 13/12* | (2006.01) | |
| *C09D 5/44* | (2006.01) | |
| *C25D 5/02* | (2006.01) | |

(52) U.S. Cl.
CPC ................ *C25D 13/00* (2013.01); *B29C 73/00* (2013.01); *C09D 5/44* (2013.01); *C25D 5/02* (2013.01); *C25D 13/12* (2013.01)

(58) Field of Classification Search
CPC ........ B29C 73/00; B29C 41/14; C25C 13/12; C25C 13/00; C25C 5/02; C09D 5/44; C09D 5/4476; C25D 5/02; C25D 13/12; C25D 7/00; C25D 5/56; C25D 9/02; C25D 13/00; C25D 13/04; B32B 15/14; C08J 5/04; C08J 5/042; Y10T 428/24802; Y10T 428/24917
USPC ......................................................... 204/509
See application file for complete search history.

(56) References Cited

U.S. PATENT DOCUMENTS

| | | |
|---|---|---|
| 4,272,346 A | 6/1981 | Jakubowski et al. |
| 2005/0161337 A1 | 7/2005 | Byrd et al. |
| 2007/0240901 A1* | 10/2007 | Okamoto et al. ............. 174/262 |

FOREIGN PATENT DOCUMENTS

| | | |
|---|---|---|
| DE | 102011004801 | 8/2012 |
| JP | 63297031 | 12/1988 |

OTHER PUBLICATIONS

European Search Report, Dec. 19, 2012.

* cited by examiner

*Primary Examiner* — Xiuyu Tai
(74) *Attorney, Agent, or Firm* — Greer, Burns & Crain Ltd.

(57) ABSTRACT

A process of repairing defects on a carbon fiber reinforced plastic (CFRP) component wherein defects on a surface of a CFRP component are selectively repaired by electrodeposition coating. With this process a reduction of coating material and work force as well as weight of the repaired CFRP component can be achieved.

11 Claims, 5 Drawing Sheets

US 9,284,658 B2

PROCESS FOR SELECTIVE ISOLATION OF CFRP PARTS BY ELECTRODEPOSITION COATINGS

CROSS-REFERENCES TO RELATED APPLICATIONS

This application claims the benefit of the U.S. Provisional Application No. 61/674,898, filed on Jul. 24, 2012, and of the European patent application No. 12 177 698.3 filed on Jul. 24, 2012, the entire disclosures of which are incorporated herein by way of reference.

FIELD OF THE INVENTION

The present invention relates to a process of repairing defects on a carbon fiber reinforced plastic (CFRP) component wherein defects on a surface of a CFRP component are selectively repaired by electrodeposition coating using an insulating coating material.

BACKGROUND OF THE INVENTION

Carbon fiber reinforced plastic (CFRP) components are nowadays used in many industrial fields, e.g., in the aeronautic and automobile industry, as they enable a significant weight reduction compared to previously used metal parts and provide sufficient stability and therefore safety for the user.

During production of CFRP components carbon fibers are suspended in resin and then hardened. After hardening the CFRP components often are further treated, e.g., by grinding, cutting, sharpening, forming, etc. However, during these further treatments or already during the production of the CFRP components normally defects occur on the surface thereof, e.g., places where carbon fibers are at least partially exposed to the surroundings.

If such places with defects are then bound to a metal in a hybrid structure in e.g., airplanes, cars, bikes, etc. and water is present or gets to the binding location between an exposed carbon fiber part and the metal, a galvanic cell may be formed, which may lead to rusting of the metal due to the reduction of oxygen on the carbon fiber.

To avoid the formation of a galvanic cell it is therefore necessary to repair those surface defects, e.g., at edges, but also pores formed during the CFRP component production and to insulate the CFRP component.

Conventionally this repairing of defects is either carried out manually, which requires a lot of time and labor and is thus time- and cost-extensive, or is done by extensive application of isolating glass plies, resin layers or coatings, using e.g., epoxy resin or polyurethane resin, which is costly and requires a significant amount of material.

It is also known to use electrodeposition coating for composite components after a previous metallization of the components for different purposes. However, also such treatment leads to an increase in weight of the CFRP component and thus is not advantageous, especially in light-weight applications. Also this electrodeposition coating after metallization does not target the electrical insulation of the composite component in order to avoid the formation of galvanic cells and therefore corrosion in CFRP/metal hybrid structures.

A conventional electrophoretic deposition process is known from WO 95/23246, according to which a defect-free metallic oxide coating can be deposited on a substrate.

SUMMARY OF THE INVENTION

The invention thus intends to overcome this problem of cost- and material-extensive methods for repairing/insulating defects in CFRP components.

Further, the invention is intended to improve the corrosion protection of CFRP hybrid structures, in particular CFRP/metal hybrid structures, at minimum cost and weight.

The invention is based on the findings of the present inventors that defects on the surface of CFRP components can be made visible by electrolytic metal deposition, as can be seen e.g., in FIGS. 1A and 1B using galvanic copper deposits that make up in this specific case 38.2% of the surface (white stripes), wherein the left image shows an overview and the right image a close-up. Based on estimates on fiber conductivity and surface conductivity it was concluded that defects on CFRP components can be repaired by electrodeposition coating, which could be further demonstrated for the inventive process.

Thus the invention allows a reduction of the manufacturing efforts and costs to a minimum due to a possible automation as well as an easy selective repairing of defects on CFRP components as well as a reduction of material used for repairing. In a fully automated process a reduction of workforce of >50% can be achieved.

Further advantageous embodiments and improvements can be found in the dependent claims.

BRIEF DESCRIPTION OF THE DRAWINGS

The invention will in the following be described in detail with reference to Figures, wherein the scope of the invention is not intended to be limited to those Figures.

In the Figures the following is shown.

DETAILED DESCRIPTION OF THE PREFERRED EMBODIMENTS

Figure 1A:
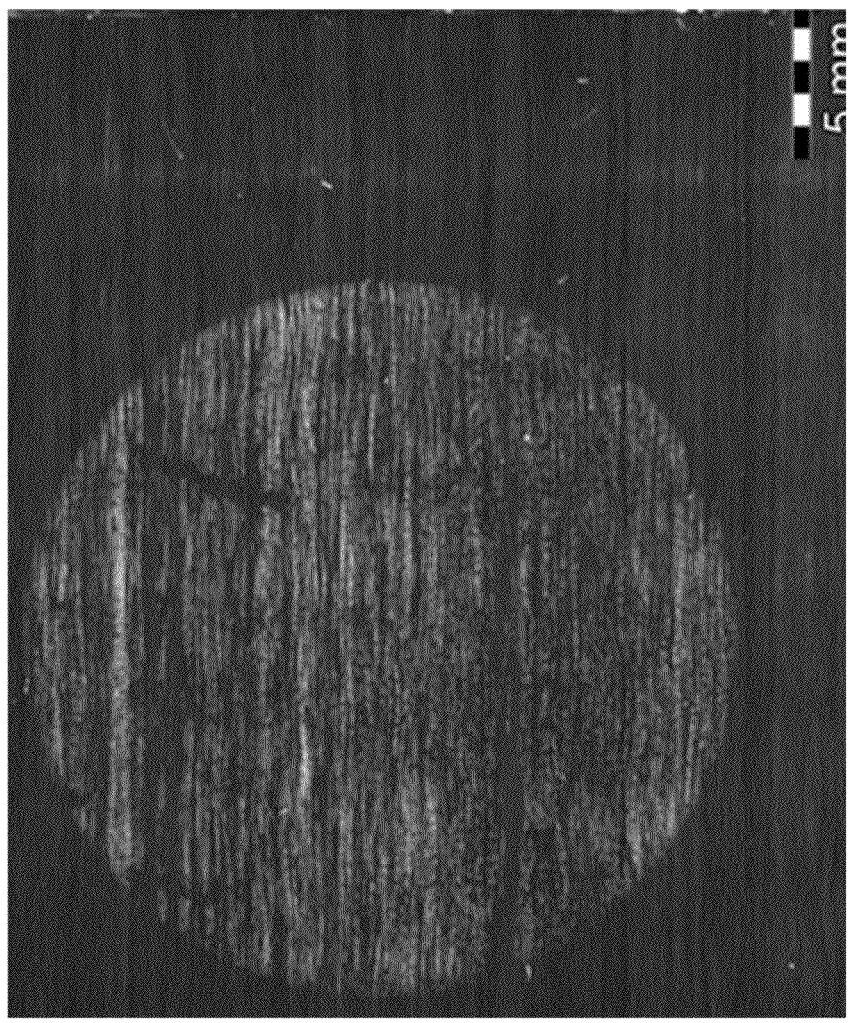
FIGS. 1A and 1B illustrate the visualization of defect areas on CFRP surfaces by electrolytic metal deposition.
Figure 1B:
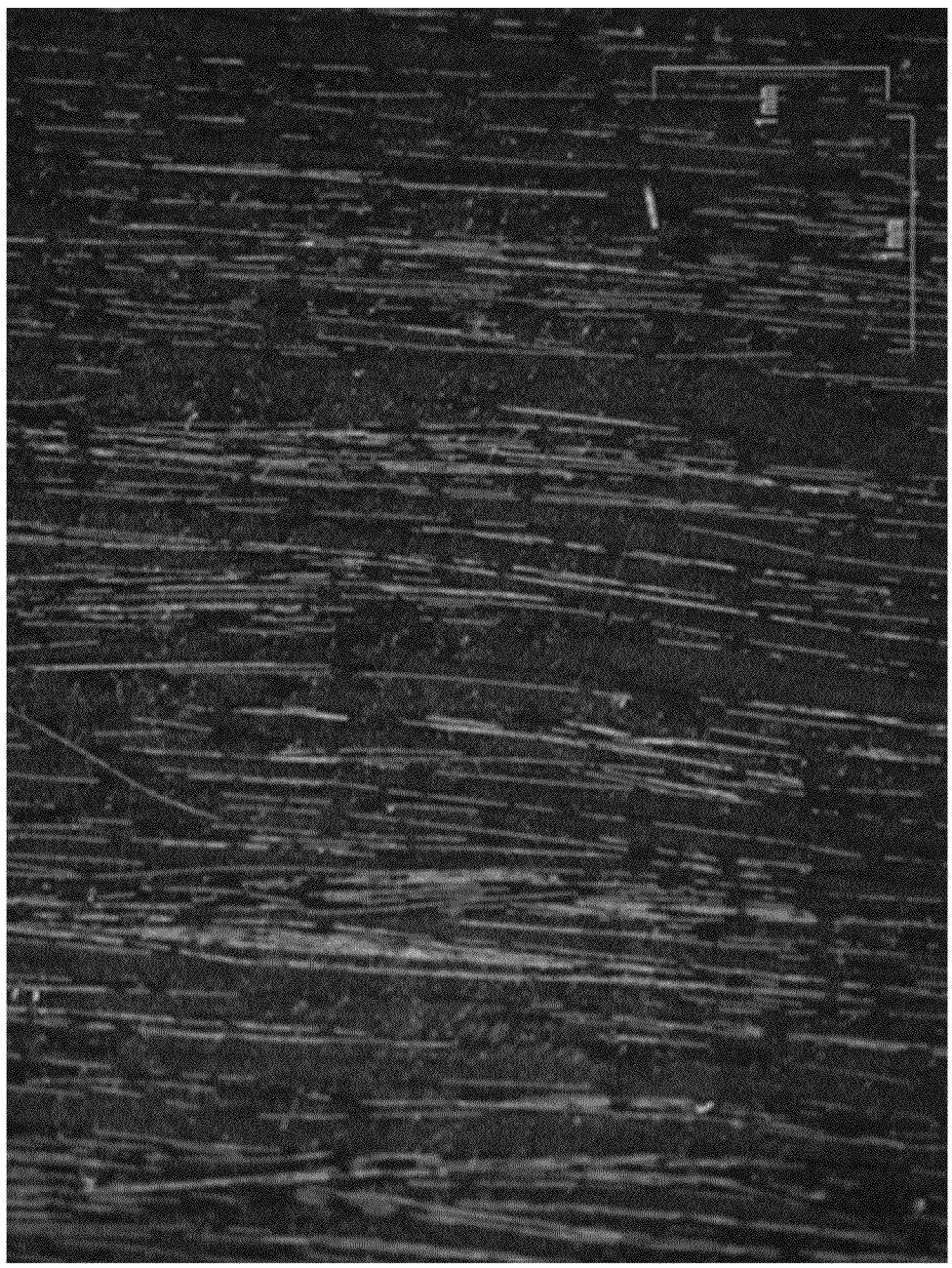

The present invention is targeted to a selective repairing of defects on CFRP components, in particular on the surface of CFRP components in order to achieve a full insulation of the CFRP component to prevent galvanic corrosion in hybrid structures. The inventors have found that a selective repairing of surface defects on a carbon fiber reinforced plastic, CFRP, component can be achieved using electrodeposition coating of an insulating coating material. In the present invention the defects can be defects and/or electrical conductive areas on the CFRP component.

Herein the term "defects" does not only refer to a plurality of defects but can also comprise a single defect. In particular the term "defects" relates to surface defects. Exemplary defects that can be found on CFRP components include, but are not limited to pores, scratches, cracks, edges, corners, ground areas, rough areas, troughs, bumps, etc. wherein at least a part of a carbon fiber is not covered from all sides by resin, i.e., at least a part of a carbon fiber is in contact with the surrounding and can also come into contact with other components during bonding of those other components to the CFRP component, or where at least a part of a carbon fiber is near the surface of the CFRP component. In contact with the surrounding herein means a location on or near the surface of the CFRP component where the carbon fiber can be negatively affected or damaged, e.g., by contact with substances from the environment. Within this description it is further contemplated that the term "defect" also refers to "electrically conductive areas," and that the term "repair" or "repairing" also refers to "insulate," "insulating" or "insulation." The term "insulation" or similar terms hereby refers to an "electrical insulation" and/or "chemical isolation," which means that the defects and/or electrical conductive areas of the CFRP component are covered by an insulating coating after the present process is applied, and the surface of the CFRP component after the process is electrically insulating. Electrically insulating refers to an electrical surface conductivity of less than 10-6 ohms/cm2. Chemical isolation means that no electrolyte from the surrounding can access the CFRP fibers.

In the present process, the size of a defect and/or an electrical conductive area to be repaired/insulated is not particularly restricted.

The term "selectively" refers to a deposition of insulating coating material specifically at locations where carbon fibers of the CFRP component are exposed to the surrounding on the CFRP component or are near the surface of the CFRP component, i.e., within a distance of a few micrometers from the surface, preferably less than 100 μm, more preferably less than 50 μm and further more preferably less than 20 μm from the surface.

The carbon fibers used in the CFRP component of the present process are not particularly limited, and any carbon fiber can be used that is used in general carbon fiber reinforced plastic material or carbon fiber reinforced plastic components.

Further, the resin of the carbon fiber reinforced plastic component is also not particularly limited, and any resin usually used in general carbon fiber reinforced plastic material or for general carbon fiber reinforced plastic components can be used, like epoxy, polyester, vinyl ester or nylon resin.

The resin content in the CFRP component is not particularly limited as long as the CFRP component can be formed.

Also, any further additives normally used in carbon fiber reinforced plastic components can be present in the CFRP component, like other fibers, binders, hardeners, etc.

According to the present process the CFRP components can be repaired by electrodeposition coating. The electrodeposition coating is not particularly limited as long as the coating material can be deposited on the surface defect due to the electrophoretic deposition of the dipping varnish on the electrically conducting carbon fiber.

As the electrodeposition coating in the present process is controlled by the electrical current flow, also an intrinsic quality control can be achieved. In certain embodiments the coating deposition rate in the electrodeposition coating is directly depending on the electrical field density such that the highest deposition rates occur at areas with the highest field strengths. These areas are typically defects where at least a part of a carbon fiber is exposed to the surrounding/environment, such as pores or cut edges, as the resin material of the CFRP component typically is insulating. This way the defects can be selectively coated, and it can be avoided that any defects are overseen and remain unprotected. At the same time the increasing insulation of defects due to the electrodeposition coating results in a self-inhibition of the electrodeposition coating, thus ensuring a homogeneous coating result for all defects, e.g., in terms of layer thickness of the coating. The electrodeposition coating thus can be inherently self-controlling.

Most of the conventional dipping varnishes commonly used for coating of metals can be used in the present invention as insulating coating material, as long as they are insulating, i.e., prevent conduction of electricity. Preferably used are dipping varnishes that are electrically insulating or are forming an electrically insulating surface upon electrodeposition. Also preferable is the use of dipping varnishes that cure at a temperature below about 250° C., optionally below about 200° C., optionally below about 180° C., as otherwise the CFRP component can be damaged during curing of the dipping varnish. For some composite materials curing temperatures of the coating of even more than 200° C. may be acceptable. In addition dipping varnishes are preferable that adhere well to the resin used in the CFRP component.

In the present process preferably conventional e-coats commonly used for coating of metals can be used, i.e., emulsions of organic resins and de-ionized water which comprise some solvents and some ionic components. These e-coats form an electrically insulating layer on the carbon fibers when a voltage is applied to the CFRP component and the e-coat. With a growing thickness of the insulating layer the deposition rate of the layer is reduced, which thus leads to a homogeneous coating on various defects.

In preferred embodiments e-coats can be used that adhere well to the CFRP material.

In certain embodiments, the electrodeposition coating of the present process is an anaphoretic electrodeposition (ATL, "anodische Tauchlackierung") process or a cathaphoretic electrodeposition (KTL, "kathodische Tauchlackierung") process. In certain embodiments the electrodeposition coating is a dip coating, which can provide a fast selective repairing of CFRP components as long as the whole CFRP component is dipped into the coating material in the bath for dip coating.

The equipment used for the present process is not particularly limited, and most standard equipment commercially available for electrodeposition coating of metallic substrates can be used.

For the present process it is advantageous if the electric voltage of the equipment for the electrodeposition coating can be controlled between at least about 50 Volts and about 400 Volts, optionally between about 100 Volts and about 400 Volts. With such a voltage a fast and reliable repair of defects on CFRP components can be achieved. It is further preferred that the electrodeposition coating is carried out at a voltage where a scorching of the dipping varnish or flash-arcs can be avoided.

Furthermore it is advantageous if the CFRP-component can be wholly dipped into a bath of the coating material for the electrodeposition coating so that they are fully immersed in the coating and the repairing of the defects can be carried out in one process.

The production method of the CFRP component is not particularly limited, as long as the CFRP component that is formed has at least a defect that is to be repaired by the present process.

In certain embodiments it can be useful to clean at least parts of the CFRP component prior to the electrodeposition coating with standard cleaning processes in order to remove contaminations or release residuals, particularly if the manufacturing process of the CFRP component does not deliver a contamination free surface.

In certain embodiments it can be preferable that no previous metallization of the CFRP component takes place, as in such cases the whole CFRP component would then have to be insulated. Also a metallization increases the weight of the CFRP component.

In certain embodiments it can be preferable that no further coating of the CFRP component with another coating technique, e.g. spray coating, etc. takes place prior to the repairing of defects of the CFRP component, as a coating would increase the weight of the CFRP component.

After such an optional cleaning the CFRP component can then be treated by the present process to repair defects on the CFRP component. After the electrodeposition coating a subsequent rinsing step can follow to remove remaining coating material that has not been deposited. Furthermore a heat curing of the coating can be carried out after the electrodeposition coating and/or after the cleaning at a temperature that is specific to the individual coating, typically between about 100° C. and about 200° C.

The present process can be applied for repairing CFRP components in general, and in particular CFRP components that are to be used in CFRP/metal hybrid designs. In this respect and in certain embodiments, the process can be applied to all CFRP/metal hybrid designs with a risk of galvanic corrosion between the CFRP component and the respective relevant metals due to the lower electrochemical potential of the metal. Exemplary metals herein can be aluminum, magnesium or steel.

The present process can be applied to any CFRP components used in any particular fields, in particular in fields where lightweight components with good rigidity are required, e.g., in the aeronautic and automotive fields, e.g. in airplanes, rockets, automobiles like racecars, cars, buses, trucks, boats including sailboats, bicycles and motorcycles. The CFRP components that can be repaired by the present process can also be used in the field of consumer goods and leisure goods such as laptops, cameras, tripods, sports equipment like fishing rods, hockey sticks, paintball equipment, racquet frames, golf clubs, pool/billiards/snooker cues, helmets for climbing and/or paragliding or archery equipment, tent poles, stringed instrument bodies, drum shells, etc.

The invention will be explained in more detail on the basis of the following examples which are not intended to limit the invention.

Example 1

CFRP components of a material comprising Fibredux 913C-815 with a resin content of 35-40% by volume was treated with peel ply and wet-ground.

These components were then treated either by anaphoretic electrodeposition or cathaphoretic electrodeposition under the following conditions to check for the influence of several parameters on the coating result:

Cathaphoretic Deposition:
Resin: acryl-based resin of ICI company
Temperature: 20° C.-40° C.
Voltage: 100 V-180 V
Duration: 0.5 minutes-2 minutes
Anaphoretic Deposition:
Resin: polyester-melamine-based resin of Herberts company
Temperature: 25° C.+/−2° C.
Voltage: 130 V-170 V
Duration: 0.5 minutes-2 minutes Under all conditions a satisfactory repairing and insulation of surface defects could be achieved.

Figure 2:
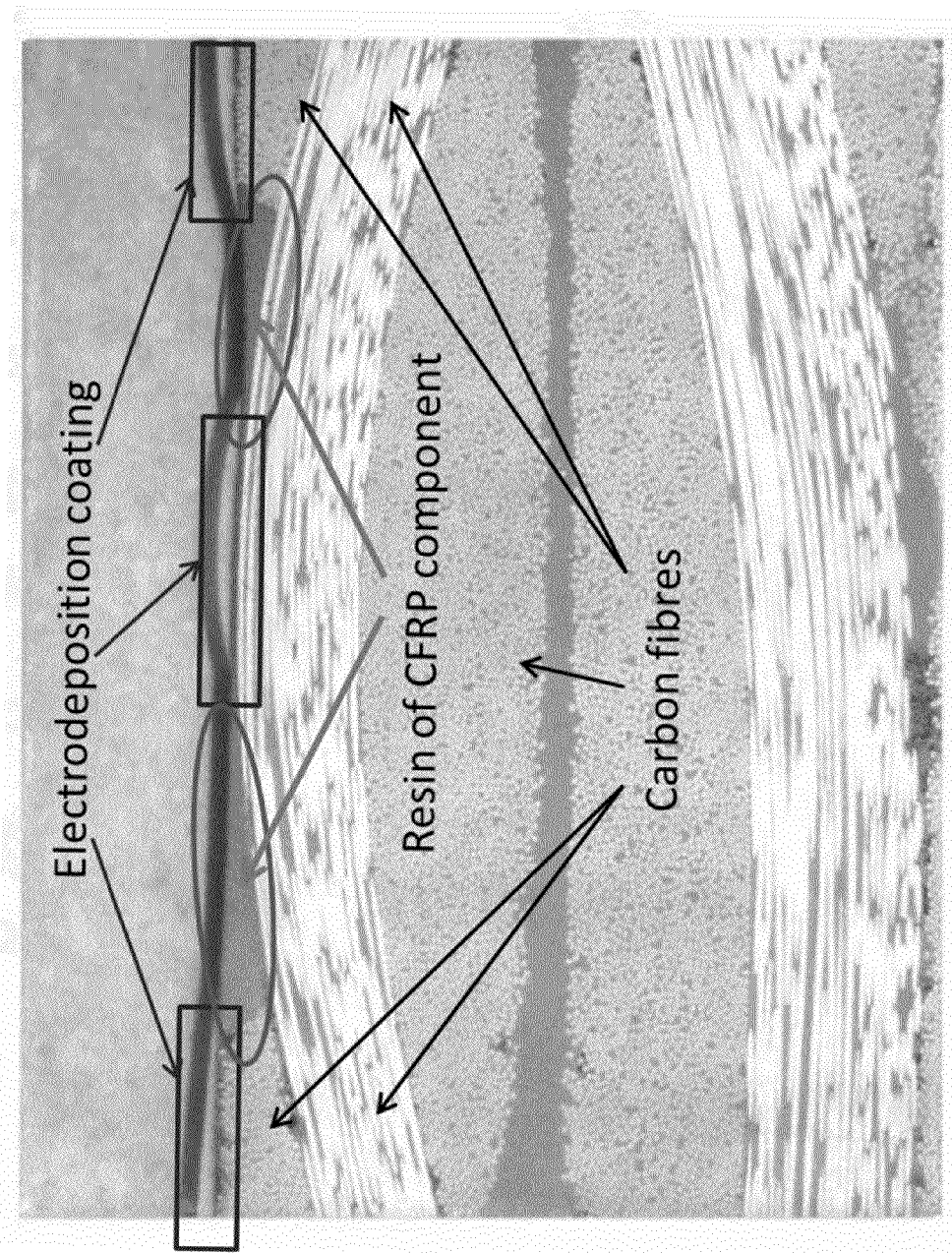
FIG. 2 shows an image of a cut through a CFRP component where a polyester-melamine-based resin has been used to repair/insulate defects on the CFRP component by anaphoretic electrodeposition.

An exemplary repairing of a CFRP component with anaphoretic deposition using the polyester-melamine-based resin can be seen in FIG. 2. FIG. 2 shows a CFRP component produced from a weave of CFRP parts, wherein the surface is seen as a black line that is an artifact of the image generation, and the surrounding air is seen above this line. In FIG. 2 the carbon fibers are visible as small white dots (vertically cut fibers) in the middle, the bottom and the upper left and right hand corner of the CFRP component and as two long curved bundles of lines (horizontally cut fibers) from left to right, showing the weave structure of the CFRP component. The resin of the CFRP component is seen in the middle of the CFRP component as a line as well as between the carbon fibers as dark grey areas, and two further pure resin areas are also seen above the upper curved fiber bundle next to the vertically cut fiber areas in the upper left and right hand corner of the CFRP component as grey triangles, marked with two ovals. These triangles are areas where the curved fiber bundle is protected from the environment by the resin of the CFRP component, and no anaphoretic deposition of the polyester-melamine-based resin took place. In contrast a deposition of polyester-melamine-based resin by anaphoretic deposition, visible as light grey half-moons, took place in the upper left and right hand corner of the CFRP component as well as the peak of the upper curved fiber bundle where the carbon fibers are exposed to the surroundings or at least near the surface of the CFRP component, and the depositions are marked with three rectangular boxes for better visibility. The anaphoretic electrodeposition occurs over the locations where carbon fibers are exposed or near the surface, and decreases at the locations where the carbon fibers are covered by resin of the CFRP component, i.e., the dark grey triangles. This shows that the CFRP component can be selectively repaired by this treatment at locations where carbon fibers are exposed or near the surface.

Figure 3:
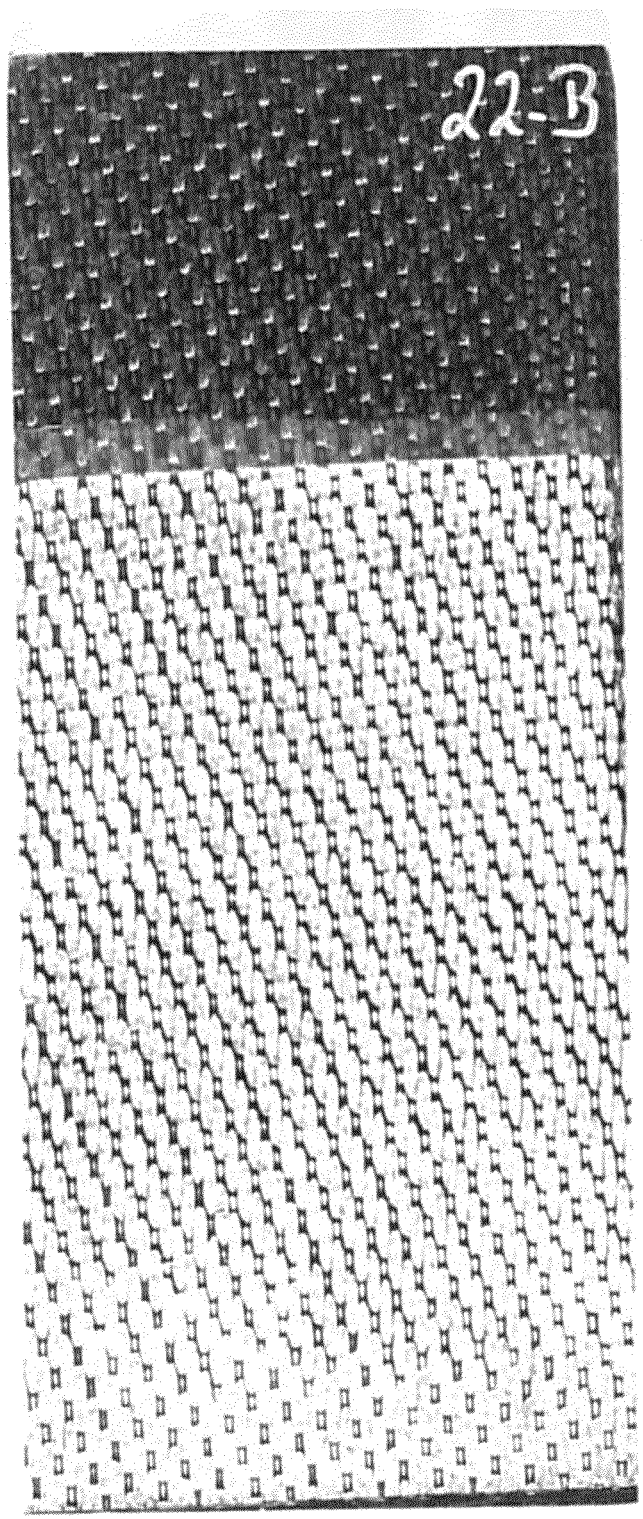
FIG. 3 shows an overview of a CFRP component wherein carbon fibers on and near the surface of the CFRP component have been repaired/insulated by cathaphoretic electrodeposition.
Figure 4:
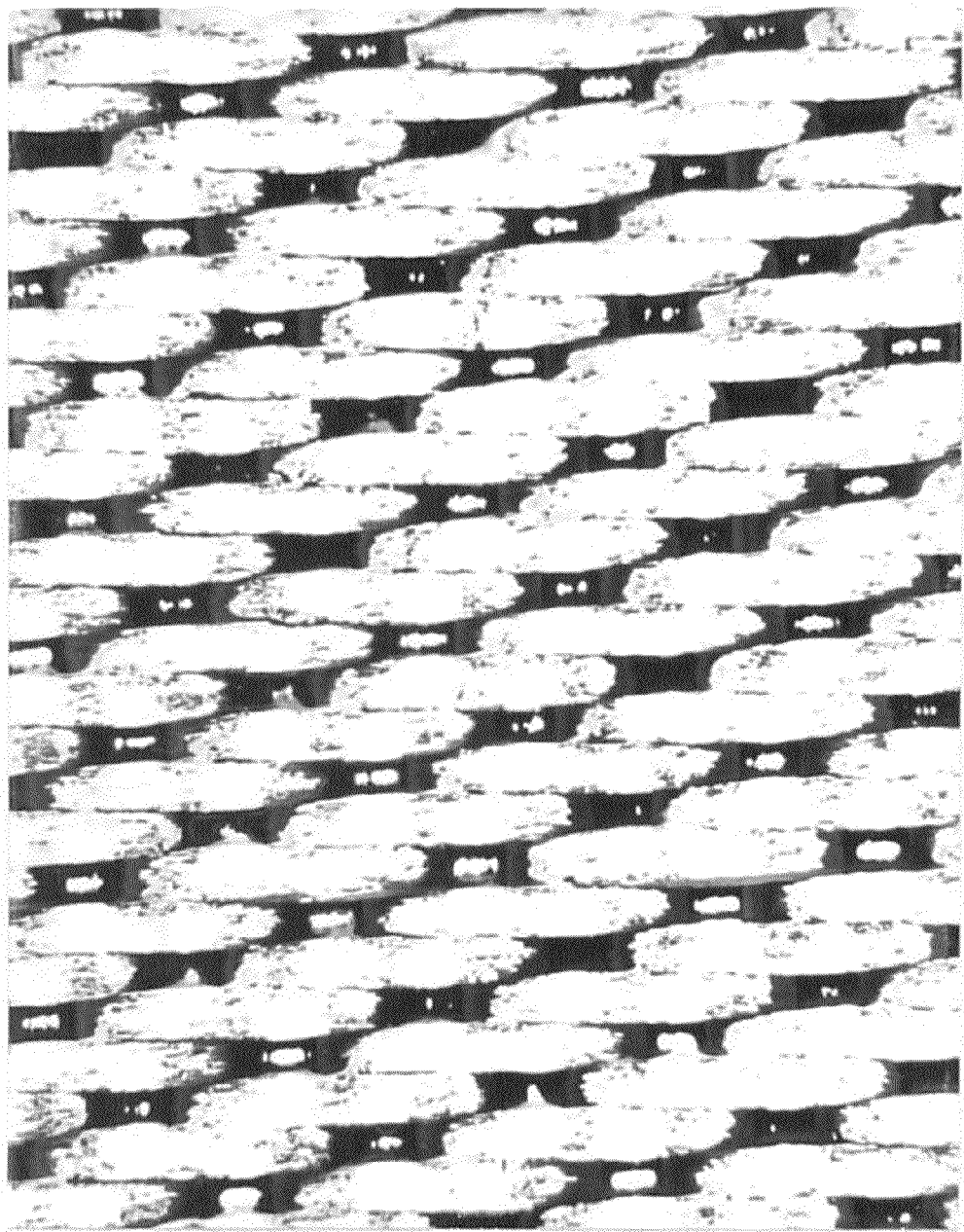
FIG. 4 shows a magnification of a section in FIG. 3.

FIG. 3 shows an overview of a CFRP component treated by cathaphoretic electrodeposition, wherein the electrodeposition occurred in the white areas selectively over areas where carbon fibers are exposed or near the surface, whereas carbon fibers are covered by the resin of the CFRP component in the dark areas. FIG. 4 shows a magnification of an area in FIG. 3, where this selective coating of the carbon fiber areas can be seen in more detail.

Example 2

Various CFRP components with various compositions were cleaned with a solvent after the initial treatment, and an electrodeposition coating was carried out with ATL Aerocron™ of PPG company at a temperature of 25° C. at voltages of 90 V-210 V for 2 minutes, with a ramp in the first 30 seconds and a constant voltage for 90 seconds.

As in example 1 under all conditions a satisfactory repairing and insulation of surface defects could be achieved.

Although the present invention has been described in connection with certain exemplary embodiments thereof it is not limited to these examples, but also encompasses various modifications made thereto.

The invention claimed is:

1. A process for repairing defects on a carbon fiber reinforced plastic, CFRP, component, wherein defects on the CFRP component are selectively repaired by electrodeposition coating using an insulating coating material, wherein the insulating coating material is deposited specifically at locations where carbon fibers of the CFRP component are exposed to the surrounding on the CFRP component and are near the surface of the CFRP component.

2. The process according to claim 1, wherein the defects are at least one of surface defects and electrical conductive areas on the CFRP component.

3. The process according to claim 1, wherein the electrodeposition coating is one of an anaphoretic electrodeposition coating and a cathaphoretic electrodeposition coating.

4. The process according to claim 1, wherein the electrodeposition coating is carried out with a dipping varnish that can be cured at a temperature at or below 250° C.

5. The process according to claim 4, wherein the dipping varnish is an electrically insulating dipping varnish.

6. The process according to claim 1, wherein the electrodeposition coating is carried out at a voltage of 50 V to 400V.

7. The process according to claim 1, wherein the carbon fiber reinforced plastic comprises carbon fibers and a resin.

8. The process according to claim 1, wherein the defects are places wherein a carbon fiber is at least partially not covered by resin.

9. The process according to claim 1, wherein the CFRP component is not metallized before the electrodeposition coating.

10. The process according to claim 1, wherein the CFRP component is at least one of rinsed and cured after the electrodeposition coating.

11. The process according to claim 1, wherein carbon fibers near the surface of the CFRP component are within a distance of less than 100 μm from the surface.

\* \* \* \* \*